(12) United States Patent
Kuhlman

(10) Patent No.: US 8,726,563 B2
(45) Date of Patent: May 20, 2014

(54) NON-SNAGGING FISH HOOK WHICH AUTOMATICALLY CLAMPS A SET FISH HOOK TO THE MOUTH OF A FISH

(76) Inventor: Donald Kuhlman, Grand Haven, MI (US)

( * ) Notice: Subject to any disclaimer, the term of this patent is extended or adjusted under 35 U.S.C. 154(b) by 628 days.

(21) Appl. No.: 12/465,651

(22) Filed: May 14, 2009

(65) Prior Publication Data

US 2009/0282725 A1 Nov. 19, 2009

Related U.S. Application Data

(60) Provisional application No. 61/054,164, filed on May 18, 2008.

(51) Int. Cl.
*A01K 85/02* (2006.01)
*A01K 83/00* (2006.01)

(52) U.S. Cl.
USPC ............. 43/43.4; 43/43.6; 43/43.2; 43/42.4; 43/42.43

(58) Field of Classification Search
USPC ......... 43/43.16, 43.2, 43.4, 43.6, 42.4, 42.43, 43/44.2, 44.8
See application file for complete search history.

(56) References Cited

U.S. PATENT DOCUMENTS

| | | | | |
|---|---|---|---|---|
| 94,894 A * | 9/1869 | Kemlo | | 43/44.8 |
| 379,080 A * | 3/1888 | Rice | | 43/42.43 |
| 712,032 A * | 10/1902 | Baker | | 43/43.6 |
| 719,704 A * | 2/1903 | Trakel | | 43/43.6 |
| 741,916 A * | 10/1903 | Baker | | 43/43.6 |
| 797,281 A * | 8/1905 | Henzel | | 43/43.6 |
| 808,239 A * | 12/1905 | Homan | | 43/42.43 |
| 859,045 A * | 7/1907 | Burke | | 43/43.4 |
| 882,882 A * | 3/1908 | Henzel | | 43/43.6 |
| 889,356 A * | 6/1908 | Carpenter | | 43/43.4 |
| 911,040 A * | 2/1909 | Hickey | | 43/44.8 |
| 934,150 A * | 9/1909 | Evans et al. | | 43/43.6 |
| 1,166,529 A * | 1/1916 | Kruse | | 43/43.6 |
| 1,180,073 A * | 4/1916 | Payton | | 43/43.4 |
| 1,323,394 A * | 12/1919 | Jones | | 43/44.8 |
| 1,325,530 A * | 12/1919 | Jones | | 43/44.8 |
| 1,573,553 A * | 2/1926 | Klipec | | 43/43.6 |
| 1,609,209 A * | 11/1926 | Schnell | | 43/42.43 |
| 1,649,140 A * | 11/1927 | Steffens | | 43/36 |
| 1,766,279 A * | 6/1930 | Brown | | 43/44.8 |
| 1,869,293 A * | 7/1932 | Wolford | | 43/43.6 |
| 2,078,162 A * | 4/1937 | Robins | | 43/43.6 |
| 2,277,790 A * | 3/1942 | Sisco | | 43/42.4 |
| 2,298,811 A * | 10/1942 | Sisco | | 43/42.43 |
| 2,319,246 A * | 5/1943 | Martin | | 43/44.6 |
| 2,424,599 A * | 7/1947 | Burns | | 43/43.4 |
| 2,513,256 A * | 6/1950 | Sonnenburg | | 43/43.16 |

(Continued)

*Primary Examiner* — Darren W Ark
(74) *Attorney, Agent, or Firm* — Michael Ries

(57) ABSTRACT

A non-snagging fish hook having a shaft with a barb at one end and an opening at another end for receiving a line is attached to a wire loop member. The wire loop member is a continuous length of flexible wire bent back upon itself at a place between its two ends to provide a first end having an open loop, a second end having said two ends, and two substantially parallel wires that extend from the first end to the second end. The second end is attached to the fish hook near the opening for receiving a line. The wire loop member is not in tension and does not engage the barb end of the fish hook. When a pushing force is applied, it resists with a progressively increasing resistance force.

7 Claims, 6 Drawing Sheets

(56) References Cited

U.S. PATENT DOCUMENTS

| | | | | |
|---|---|---|---|---|
| 2,571,222 | A | * | 10/1951 | Dyer ............................ 43/42.43 |
| 3,006,101 | A | * | 10/1961 | Zeman .......................... 43/44.8 |
| 3,169,338 | A | * | 2/1965 | Morin ........................... 43/43.6 |
| 3,221,437 | A | * | 12/1965 | De Long ....................... 43/43.6 |
| 3,357,125 | A | * | 12/1967 | Jester ........................... 43/43.6 |
| 3,395,480 | A | * | 8/1968 | McPherson ................... 43/42.43 |
| 3,400,484 | A | * | 9/1968 | Beard ........................... 43/43.2 |
| D214,269 | S | * | 5/1969 | Jeff ............................... 43/42.43 |
| 3,465,466 | A | * | 9/1969 | Showalter ..................... 43/43.6 |
| 3,497,988 | A | * | 3/1970 | Childers ....................... 43/43.6 |
| 3,562,948 | A | * | 2/1971 | Santo et al. ................... 43/43.4 |
| 3,605,318 | A | * | 9/1971 | Santo et al. ................... 43/43.6 |
| 3,731,419 | A | * | 5/1973 | Candy ........................... 43/44.8 |
| D227,463 | S | * | 6/1973 | Perrin ........................... 43/42.43 |
| 3,748,773 | A | * | 7/1973 | Goforth ......................... 43/44.8 |
| 3,841,014 | A | * | 10/1974 | Thomas et al. .............. 43/43.16 |
| 3,986,290 | A | * | 10/1976 | Chapman ...................... 43/43.6 |
| 4,221,069 | A | * | 9/1980 | Esses ............................ 43/44.2 |
| 4,349,979 | A | * | 9/1982 | Strantz .......................... 43/44.8 |
| 4,570,373 | A | * | 2/1986 | Brief ............................ 43/43.16 |
| 4,713,908 | A | * | 12/1987 | Corbitt, III .................... 43/43.4 |
| 4,922,645 | A | * | 5/1990 | Hannon et al. ................ 43/42.4 |
| 5,009,026 | A | * | 4/1991 | Corbitt, III. ................... 43/44.8 |
| 5,274,946 | A | * | 1/1994 | Fusco ........................... 43/43.6 |
| 5,274,947 | A | * | 1/1994 | Griffiths ....................... 43/44.8 |
| 5,313,736 | A | * | 5/1994 | Rosenberg et al. ........... 43/43.16 |
| 5,339,559 | A | * | 8/1994 | Strobbe ......................... 43/44.8 |
| D390,626 | S | * | 2/1998 | Orfanides et al. ............ D22/144 |
| 5,950,350 | A | * | 9/1999 | Norton .......................... 43/43.6 |
| 5,953,851 | A | * | 9/1999 | Van Der Hoven et al. .... 43/43.4 |
| 5,983,554 | A | * | 11/1999 | Storey ........................... 43/43.4 |
| 6,164,007 | A | * | 12/2000 | Van Der Hoven et al. .... 43/43.4 |
| 6,560,917 | B2 | * | 5/2003 | Van Der Hoven et al. .... 43/43.4 |
| 7,673,414 | B1 | * | 3/2010 | Ivey .............................. 43/43.6 |
| 2006/0143973 | A1 | * | 7/2006 | Corbitt, III .................... 43/44.8 |
| 2008/0202018 | A1 | * | 8/2008 | Gill ............................... 43/42.43 |

* cited by examiner

NON-SNAGGING FISH HOOK WHICH AUTOMATICALLY CLAMPS A SET FISH HOOK TO THE MOUTH OF A FISH

REFERENCE TO RELATED APPLICATION

This patent application claims the benefit of U.S. Provisional Application No. 61/054,164 filed on 18 May 2008, the disclosure of which is incorporated herein by reference, in its entirety.

BACKGROUND OF THE INVENTION

1. Field of the Invention

The present invention relates generally to fish hooks and more specifically to fish hooks that are both non-snagging and, upon penetration of the fish hook into the mouth of a fish, automatically clamps the fish hook to the mouth of the fish.

2. Description of Related Art

A variety of fish hooks include spring loaded guards which contact the barb end of a fish hook to prevent the hook from being snagged by weeds, logs or underwater objects. These fish hooks are usually referred to as non-snagging fish hooks. Prior art non-snagging fishhooks solve the single problem of preventing the fish hook from being snagged by covering the barbed end of the fish hook with a wire guard which is normally under a predetermined amount of tension. The tension is obtained by pressing the guard against the barb of the fish hook. This tension prevents underwater objects such as weeds, logs, etc. from snagging the hook. If the tension is too light, the guard will open prematurely and the fish hook will snag on weeds. If, however, the tension of the guard is too great, it may not retract from the barbed end of the hook when a fish strikes and could prevent a fish from being caught.

The present invention is a non-snagging fish hook which can prevent the fish hook from being snagged by underwater weeds, and, in addition, also clamps the fish hook to the mouth of the caught fish to prevent loosing the fish. The invention uses a fish hook having a guard that is not in tension until the guard is urged to move by contacting an obstacle or the upper or lower jaw of the mouth of a fish at the time it bites.

The present invention provides a non-snagging fish hook which provides a non-snagging feature which can prevent the hook from being snagged and a clamping feature which clamps the fish hook to the mouth of the fish.

SUMMARY OF THE INVENTION

In an embodiment there is disclosed a non-snagging type fish hook comprising:

a conventional fish hook having a shaft with a hook at one end and an opening at another end for receiving a line;

said hook end having a sharp tip and a barb spaced back from said tip;

a continuous length of flexible wire having two ends bent back upon itself at a place between said two ends to provide a first end having an open loop, a second end having said two ends, and two substantially parallel wires that extend from said first end to said second end; and said second end is attached to the shaft of the fish hook;

wherein the shaft of said fish hook behind the barb is located between said substantially parallel wires, and wherein said barb is located closer to said shaft than to said substantially parallel wires.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DETAILED DESCRIPTION OF THE INVENTION

Figure 1:
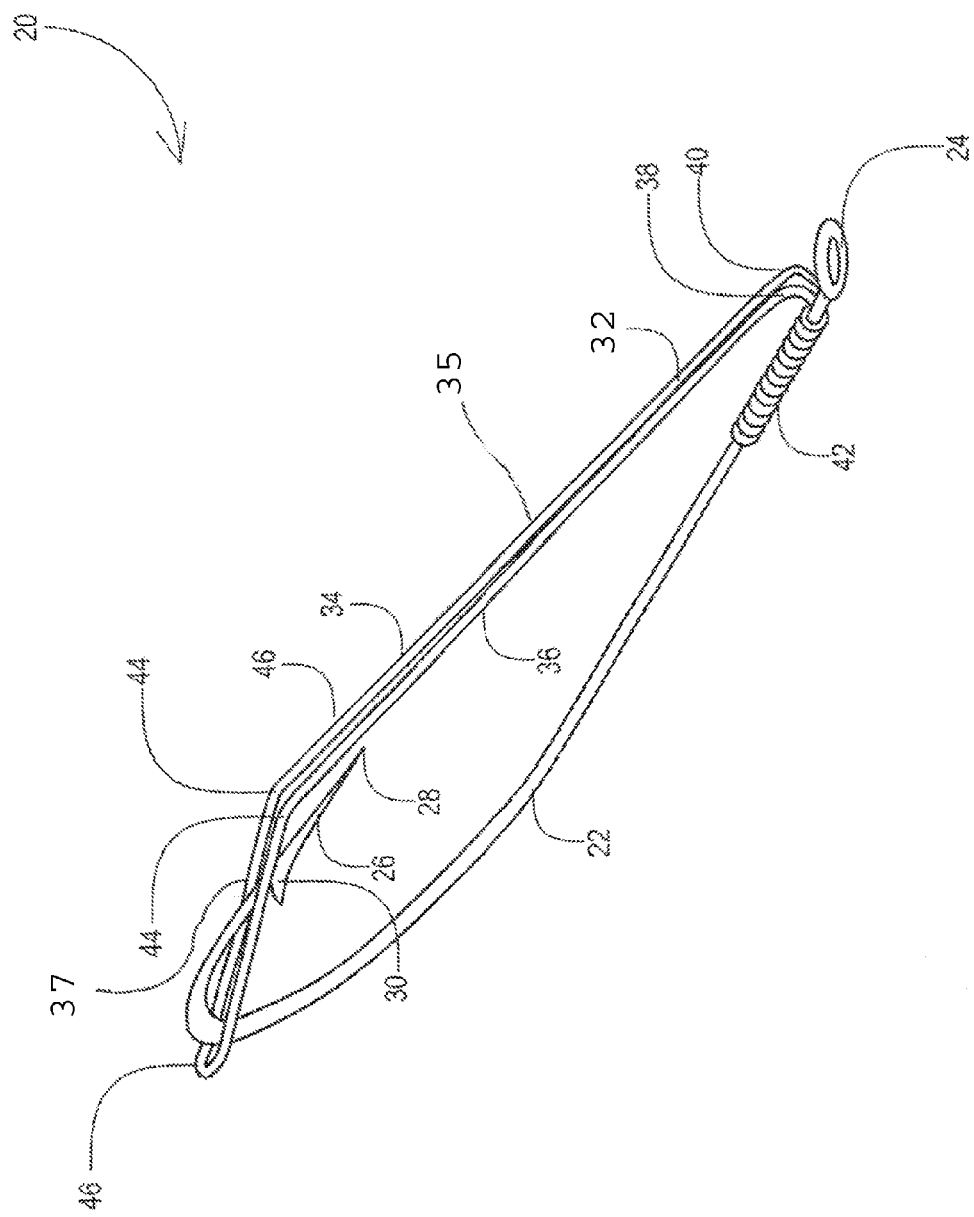
FIG. 1 is a perspective view of a wire loop member attached to a fish hook where the wire loop member is not in tension and does not engage the barb of the fish hook to provide a non-snagging type fish hook that can automatically clamp the fish hook to the mouth of a fish in accordance with the principles of the invention.

Referring to FIG. 1, fish hook 20 has a substantially straight shaft 22 with an opening 24 at a back end for receiving a fishing line or a swivel for a fishing line and, at its front end, a barb 26 having a forward facing sharp point 28 and a backward facing hook 30. The substantially straight shaft may have an abrupt bend (not shown) whose main purpose is to prevent a plastic worm from sliding down the hook when casting.

A wire loop member 32 formed from a single piece of spring wire with a first straight portion 35 and a second straight portion 37, which can be made of stainless steel to prevent rusting, is bent back upon itself at its center to provide a 180 degree hair pin turn to form two wires 34, 36 substantially equal in length and which are positioned substantially parallel to each other. The first straight portion 35, second straight portion 37 and the two wires 34, 36 can be bent at an angle of greater than 90 degrees. The ends 38, 40 of the two wires are bent to form an angle and are firmly connected to the back end of the fish hook just below opening 24 with a binding 42. In another embodiment, the ends of the two wires can be connected to the shaft of the fish hook with a split lead bead which is placed around the fish hook shaft and ends 38, 40, and then squeezed together with a pair of pliers to lock the wires to the shaft, or with epoxy glue, or other fastening means.

In another embodiment, the ends 38, 40 may be coupled to the fish hook shaft by threading the ends through the opening 24 and then wrapping the ends around the shank of the fish hook immediately below opening 24 with a binding.

Depending on the distance between the opening 24 and the barb end 26 of the fish hook, the pair of wires 34, 36 of the wire loop member can have at least one bend 44, which operates to position a portion of the shaft of the fish hook located immediately below the barbed end of the fish hook to be between the two wires 34, 36.

The bend 44 in the wire loop member can be aligned with or slightly below the barbed end of the fish hook when the wire loop member is moved past the barbed end of the fish hook The closed end 46 of the wire loop member fits around the shaft of the fish hook below the barbed end 26 of the fish hook. The wire loop member, when attached to the fish hook is in its relaxed state. It is not in tension and it does not engage the barbed end of the fish hook. It is free to move toward the fish hook when a pushing force 46 is applied and, when it is urged to do so, it will begin to resist with an increasing resistance force.

Stated differently, a wire loop member is positioned on the fish hook in a relaxed, not a tensed state, and will assume an increasing amount of tension to resist, with a progressively increasing resistance force, any pushing force 46 which is applied to the wire loop member.

The substantially parallel wires 34, 36 are substantially straight and substantially parallel to the axis of the shaft of the fish hook. Neither the end 46 of the wire loop member nor the wires 34, 36 either engage or contact the barb 26 at any time.

The wire loop member remains in its relaxed state until it is subjected to a pushing force. Until then it is not in tension and is in a relaxed state. It is only when the loop member is subjected to a pushing force that it resists with a progressively increasing force.

Figure 2:
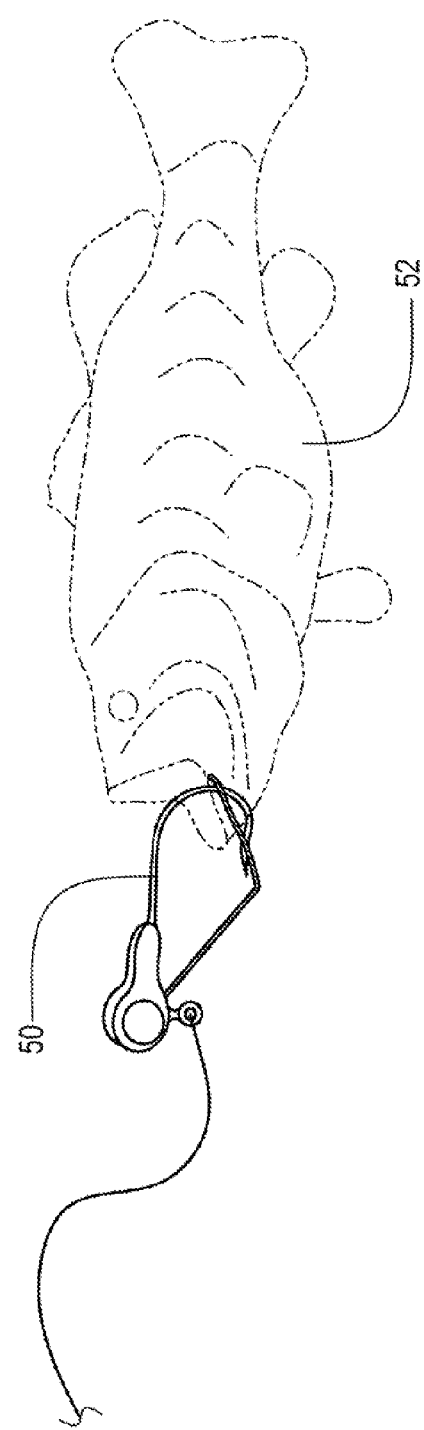
FIG. 2 is a diagrammatic side elevation view showing the operation of the invention at a time of a fish bite.

Referring to FIG. 2, there is shown a fish hook with the wire loop member 50 where the wire loop member is being pushed toward the shaft of the hook as the fish 52 bites on the fish hook. When the fish bites, the lower portion of the fish's mouth engages and urges the wire loop member to move in toward the fish hook shaft. As the wire loop member moves in toward the shaft, the loop end 46 moves along the shaft of the fish hook. Now, as the fisherman pulls back on the line to set the barbed end of the hook into the fish's mouth, the wire loop member closes against the inside of the fish's mouth. At this instant the fish's mouth is clamped between the set fish hook and the wire loop member.

The fish hook disclosed has a weed guard that is normally in its relaxed state, it is not in tension, and remains in its relaxed state until a pushing force is applied to push the wire loop member toward the shaft of the hook. It is only when a pushing force is applied to the wire loop member that it begins to resist with an increasing tension force. The greater the pushing force, the greater the tension force.

With this invention there is no initial force that the fish must overcome as it bites down on the hook or as the hook is pulled into the flesh of the fish's mouth. It is only as the wire loop member begins to move toward the shaft of the fish hook that the wire loop member is placed in tension and, when positioned inside the fish's mouth, can clamp the fish's mouth to the fish hook.

Figure 3:
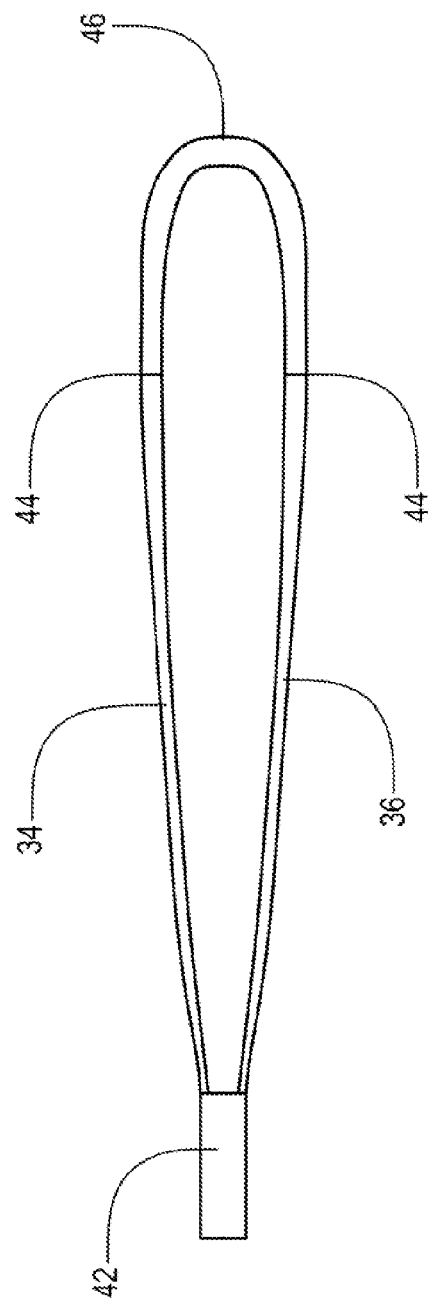
FIG. 3 is a top view of the wire loop member.

Referring to FIG. 3, there is shown a top view of the wire loop member for use with fish hooks. The wires 34, 36 extend forwardly from the binding 42 in substantially parallel gradually diverging relationship. The wires are substantially straight up to bend 44, and then continue to diverge slightly in the forward direction toward loop end 46. When the wire loop member is attached to a fish hook, the high points 44 of the wires 34, 36 are located above the barb 26 and the shaft of the fish hook below the barbed end is located between the wires 34, 36 of the wire loop member as shown in FIG. 1.

Figure 4:
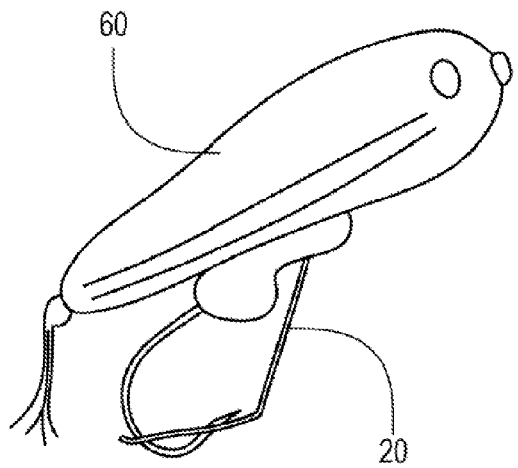
FIG. 4 is a side view of a fish hook with the wire loop member attached to a central part of a lure.
Figure 5:
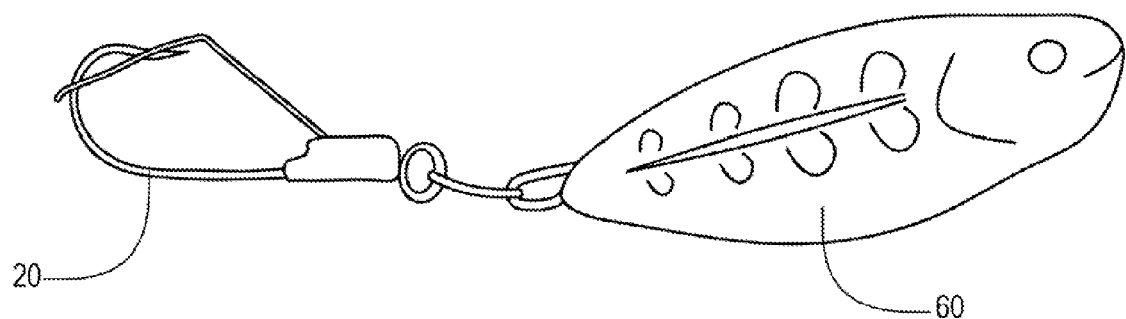
FIG. 5 is a side view of a fish hook with the wire loop member attached to a rear end of a lure.

FIGS. 4 and 5 show a fish hook in accordance with the principles of the invention attached to lures. In FIG. 4 the fish hook 20 is located back from the front of the lure 60. In FIG. 5 fish hook 20 is located at the rear of lure 60.

Figure 6:
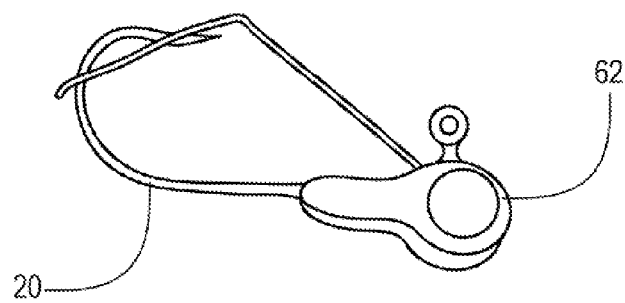
FIG. 6 is a side view of a fish hook with the wire loop member attached to a jig.
Figure 7:
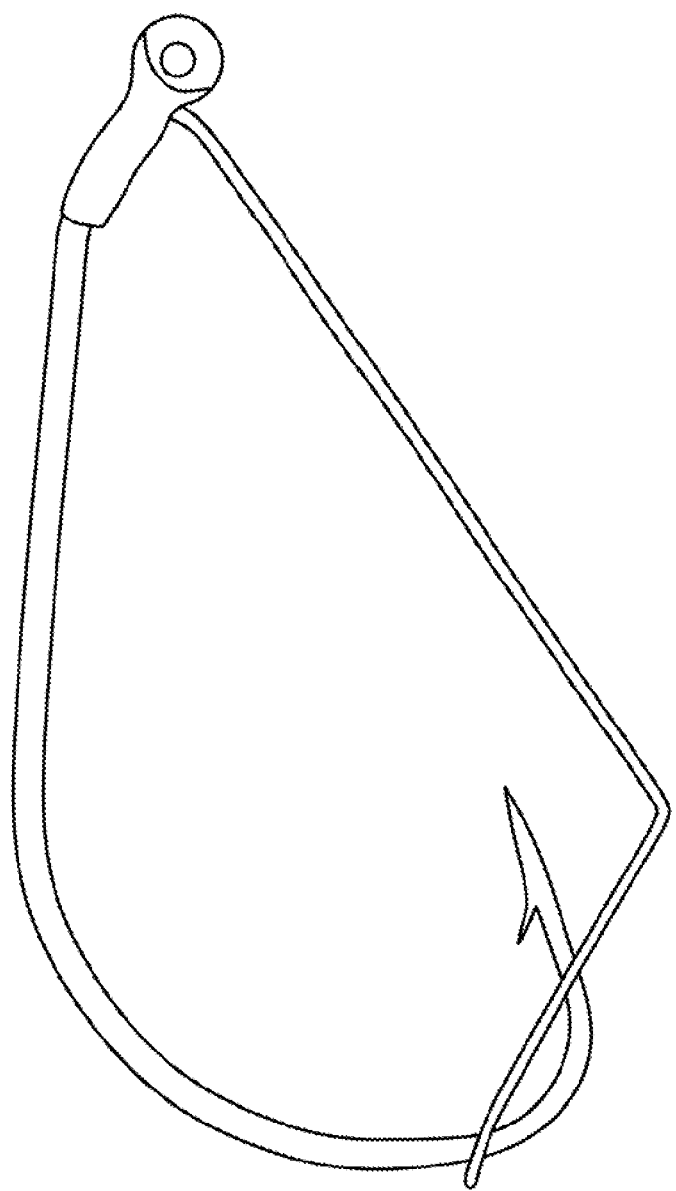
FIG. 7 is a side view of a wire loop member attached to a fish hook.
Figure 8:
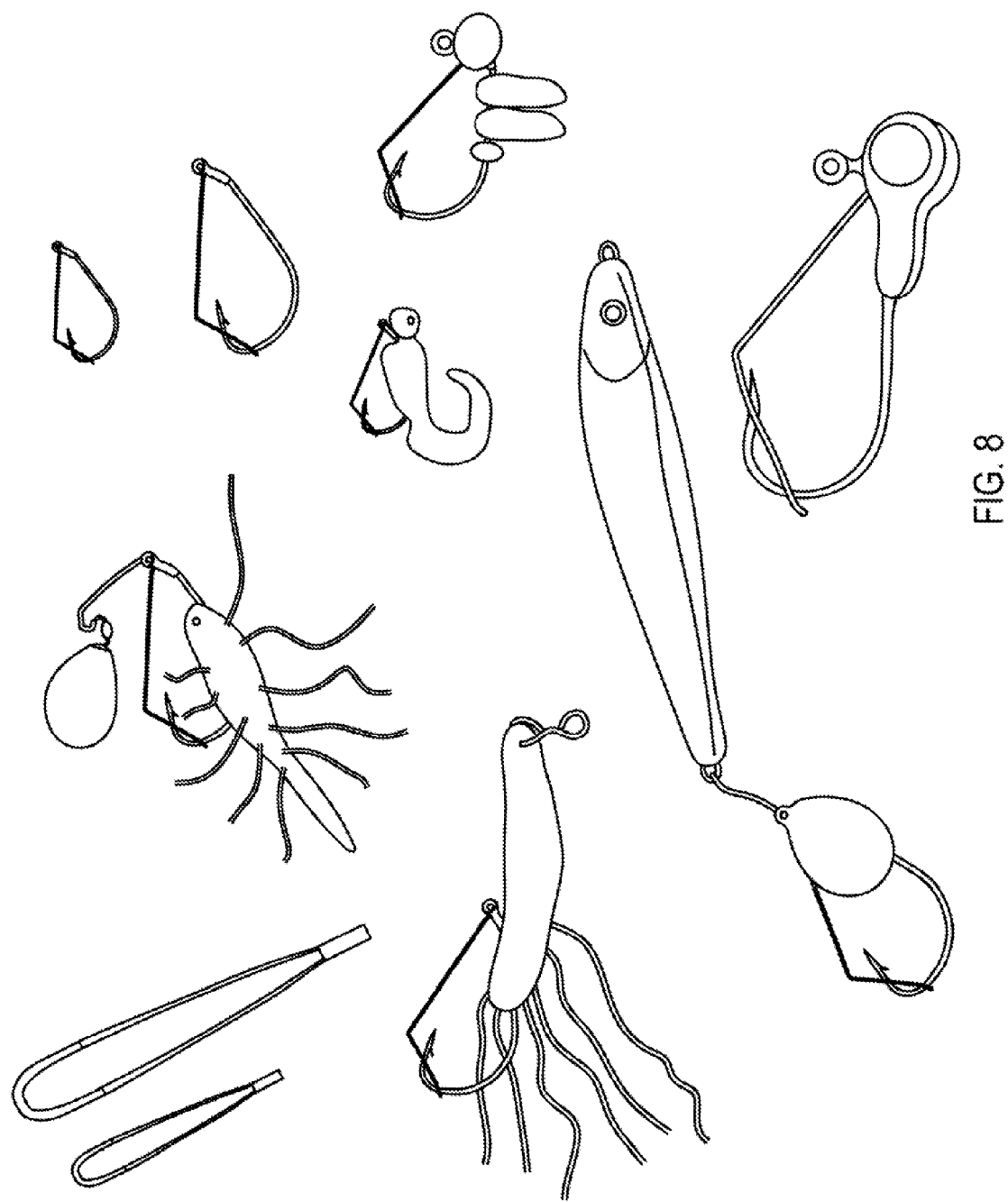
FIG. 8 is a side view of a plurality of lures with a wire loop member attached to a fish hook.

FIG. 6 shows a fish hook in accordance with the principles of the invention attached to a jig 62.

The invention here disclosed of the wire loop member in combination with a fish hook where the wire loop is not in tension and does not contact the barb, is a totally new type of non-snagging fish hook that has a new mode of operation that is not disclosed in the prior art. More specifically, the invention disclosed provides a fish hook that has the following advantages and features;

The fish hook can hold a fish hook under tension inside a fish's mouth by clamping the fish's mouth to the fish hook;

The fish hook prevents loss of a hooked fish and causes less damage and stress to the fish;

A single wire loop member encircles the barbed area and shaft of the fish hook below the barbed area, and spring tension in the wire loop member is created only when the loop member is pushed toward the shaft of the fish hook. At all other times the wire loop member is not in tension, it is in its relaxed state;

The wire loop member does not engage the barbed end of the hook;

The fish hook is non-snagging with live bait or artificial bait;

The wire loop member on the fish hook operates automatically when a feeding fish takes either live or artificial bait into its mouth;

The wire loop member functions as a guard to allow free movement around obstructions and weeds.

The wire loop member clamps a fish hook in a fish's mouth and helps in retrieving a fish quicker, with less lip damage, fish loss and stress to a fish;

The wire loop member can be used in salt or fresh water, can be attached to most hooks, lures, jigs and artificial attracting devices used to catch a fish.

The spring tension of the wire loop member can be adjusted by using wires of different diameters or by bending the wires to be closer or further from the barbed end of the hook.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. A non-snagging type fish hook, comprising:
  a fish hook having a straight shaft, a barb at one end of the fish hook, an opening at an other end of the fish hook to receive a line, and a bight between the straight shaft and barb;
  the barb at the one end having a sharp tip and a hook spaced back from the tip which extends in an opposing direction from the sharp tip;
  a continuous length of flexible wire with a first portion and a second portion having respective first ends, second ends, and intermediate extents therebetween, said intermediate extents of said first and second portions each comprising first and second straight sections which intersect at a bend, said bend defining an angle which is greater than 90 degrees, said first and second portions positioned in front of the fish hook, said first ends of said first and second portions joined together to form a loop which extends at and around the bight of the fish hook, the second ends of said first and second portions comprising two separate and distinct ends of the wire, and said first and second portions substantially parallel to each other from the first ends to the second ends;

the two separate and distinct ends are both bent toward the shaft of the fish hook and are attached with fastening means to a side of the shaft of the fish hook facing the barb at a location on the shaft which is spaced from the opening such that said two separate and distinct ends do not extend through said opening;

wherein the shaft of the fish hook below the barb is located between the substantially parallel wires; and wherein the barb is located below the bends and above the shaft.

2. The non-snagging type fish hook of claim 1, wherein the continuous length of flexible wire resists with increasing tension an increasing force applied to the first and second portions.

3. The non-snagging type fish hook of claim 2, wherein the loop at the first ends of said first and second portions is adapted to move alongside the bight to position the barb above the first and second portions as a pushing force is applied to the first and second portions.

4. The non-snagging type fish hook of claim 3, wherein the bend of each of the first and second portions is aligned with or slightly below the barb on the fish hook when the first and second portions move past the barb.

5. The non-snagging type fish hook of claim 4, wherein the first straight sections are substantially straight and substantially parallel to the shaft of the fish hook.

6. The non-snagging type fish hook of claim 5, wherein the continuous length of flexible wire comprises stainless steel.

7. The non-snagging type fish hook of claim 6, wherein the first and second portions are of substantially equal length.

\* \* \* \* \*